United States Patent [19]

Kitagawa et al.

[11] Patent Number: 5,076,744
[45] Date of Patent: Dec. 31, 1991

[54] SCREW CUTTING MACHINE

[75] Inventors: Katsuyoshi Kitagawa; Yasukazu Hayashi, both of Aichi, Japan

[73] Assignee: Okuma Machinery Works, Ltd., Nagoya, Japan

[21] Appl. No.: 579,963

[22] Filed: Sep. 10, 1990

[30] Foreign Application Priority Data

Sep. 28, 1989 [JP] Japan .................. 1-253246

[51] Int. Cl.$^5$ .................................................. B23G 1/34
[52] U.S. Cl. ................................ 409/66; 10/82; 82/110; 82/1.11; 409/71; 409/76
[58] Field of Search ............... 409/65, 66, 71, 76, 409/77, 154, 162, 67–70, 75, 78, 304–307; 82/110, 1.11, 131; 10/82, 101 R, 102

[56] References Cited

U.S. PATENT DOCUMENTS

| | | | |
|---|---|---|---|
| 1,812,205 | 6/1931 | Helin | 409/66 X |
| 2,189,867 | 2/1940 | Hagerman | 409/66 |
| 2,875,661 | 3/1959 | de Coudrey | 82/110 |
| 3,209,652 | 10/1965 | Burgsmueller | 409/66 |
| 3,486,413 | 12/1969 | Burgsmuller | 409/77 X |
| 3,545,018 | 12/1970 | Peterson | 10/101 R |

*Primary Examiner*—Steven C. Bishop
*Attorney, Agent, or Firm*—Oliff & Berridge

[57] ABSTRACT

For machining male or female screws, especially of considerably large size diameter, variable pitch or taper, as desired, a machining center is used which is composed of a work table mounting the work fixedly thereon, and a rotatable machining spindle exchangeably fitted with a thread-cutting tool. Axial feed and rotational speed of the spindle are driven by respective drive motors. In addition, the work table is fed bilaterally on a plane perpendicular to the axis of the spindle by respective feed motors. All these four motors are controlled synchronously by respective controllers which are subjected to control by a single parent numerical controller.

6 Claims, 6 Drawing Sheets

SCREW CUTTING MACHINE

BACKGROUND OF THE INVENTION

The invention relates generally to a screw cutting machine. It relates more specifically to an improved screw cutting apparatus highly suitable for use with a machining center arrangement and nevertheless capable of performing a screw cutting job for a considerably large diameter screw and/or taper screw or the like special screw in a highly simplified manner with superior precision and accuracy.

STATEMENT OF PRIOR ART

It is commonly known to use a machining center arrangement in which the work is mounted fixedly on a work table and a rotary spindle is arranged in opposition to the table, said spindle being exchangeably fitted with any suitable one of various tools including the screw cutter for the execution of various different machining jobs.

For carrying out a screw cutting job with use of such machining center arrangement, a tap or die is used as a representative of the screw cutter mentioned above for attachment to the rotary spindle.

Experience has shown, however, that when it is desired to cut considerably, large size diameter screws or taper screws or the like special screws, inhibitingly difficult jobs and/or fluctuations in dimensional accuracy of the machined products are frequently encountered as a grave defect.

OBJECT OF THE INVENTION

It is therefore an object of the invention to provide an improved screw cutting apparatus suitable for use in the machining center arrangement, and highly suitable for machining larger size diameter screws or taper screws or the like special screws without invitation of various difficulties set forth above.

Further subsidiary objects of the invention will become more apparent as the description proceeds.

SUMMARY OF THE INVENTION

For fulfillment of the foregoing objects, it is proposed to provide such an improved screw cutting machine as comprising: a table mounting a work thereon; a rotary cutter spindle exchangeably carrying any selected one of screw cutting tools extending in a perpendicular direction relative to a longitudinal axis of said spindle; a table feed drive apparatus for feeding said work table while positional controlling thereof in two mutually perpendicular directions on a plane perpendicular to the axis of said spindle; a spindle drive apparatus capable of rotary driving said spindle at a relatively slow speed and under control of rotational phase ($\theta$) thereof; an axial feed drive apparatus for feeding said spindle in its axial direction under positional control thereof toward said work; and a numerical control apparatus for driving said work table during a complete circle about the axis of said spindle while keeping said screw cutting tool in contact with the inside or external surface of the work and maintaining a preselected limit of cutting depth for a complete revolution of said spindle and for allowing said rotary spindle at the same time to move axially thereof in a length corresponding to a predetermined screw pitch to be machined and in synchronism with said full circle rotational movement of said spindle.

The inventive screw cutting machine set forth above wherein each of said table feed drive apparatus, said spindle drive apparatus and said axial feed drive apparatus, further comprises:

a drive motor;

a phase sensor for sensing rotational phase;

a controller for receiving phase display signals from said phase sensor and for motion control of said drive motor, said numerical controller performing synchronous control of all the said three drive apparatuses.

In the screw cutting machine, said axis of the rotary cutting spindle is held fixedly on its perpendicular plane preset in said machine.

In the inventive screw cutting machine, set forth above, each of said respective phase sensors consists substantially of a rotary encoder.

It is further proposed to provide an inventive process for female or male screw threading a work on a table with use of a rotary spindle carrying a screw cutting tool these directly on perpendiculars thereto, said process comprising:

a step for rotary revolution of said spindle;

a step for rotary drive of said table at such a rate that it describes a complete revolution for each complete revolution of said spindle while said tool is kept in pressure contact with the inside or outside surface of said work and at a predetermined maximum cutting depth and around the central axis of said spindle; and a step for feeding axially said spindle by a predetermined length equal to a certain pitch of the screw to be machined and in synchronism with the aforementioned steps set forth herein.

Figure 1:
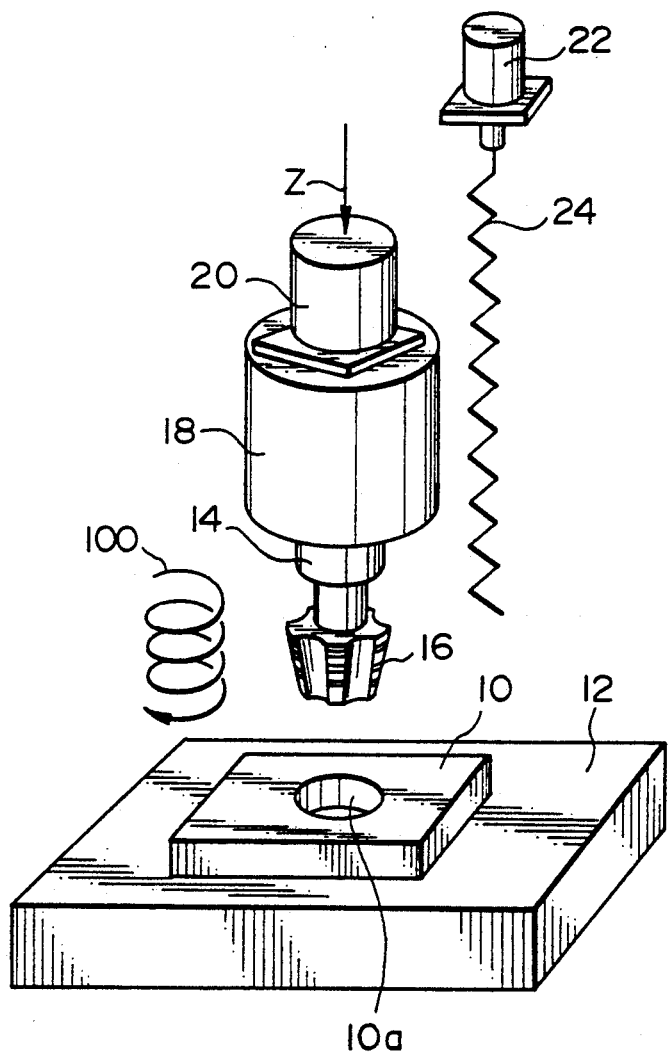
FIG. 1 is a perspective view of screw cutting state with the use of a conventional machining center arrangement.

In the following, related prior and objects, and features of the present invention will be illustrated more in detail with reference to the accompanying drawings.

PREFERRED EXAMPLE OF PRIOR ART

Before setting forth a preferred embodiment of the present invention, an example of the related prior art from which the invention has been derived, will be described in detail and indeed, with reference to FIGS. 1-4.

In these drawings, 10 represents a work which is fixedly mounted on a machining table 12. A spindle 14 is rotatably mounted in opposition to the work 10 or table 12, while mounting a working tool 16, preferably such as a shell tap, as specifically shown, or the like, for the purpose of performing a screw-cutting job as desired, around a prefabricated guide opening 10a through the work 10.

For rotating the spindle 14, having a drive head 18, the latter is connected with a spindle drive motor 20 and the said shell tap 16 can be brought into rotation at a specifically selected speed.

The spindle 14 must be fed in its axial direction as indicated by a small arrow Z. For this purpose, an axial feed motor 22 is provided for rotating a feed screw 24 which is shown only schematically by virtue of its highly well-known nature. By the provision of this rotatable feed screw 24, the rotating spindle 14 can be fed in its axial direction Z, although the feed mechanism has been omitted from the drawing in detail with the exception of said feed screw 24. Thus, in this way, the spindle 14 can perform the desired screw feed in synchronism with the rotary movement of the spindle.

In this FIG. 1, numeral 100 represents schematically the rotary locus of shell tap 16 and it may be well understood that the desired screw cutting job is realized so as to have the desired screw pitch.

Figure 2:
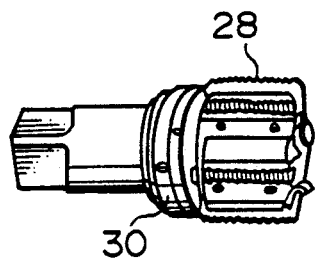
FIG. 2 is a perspective view of a conventional inserted chaser tap.

In the case of a large diameter screw to be cut on the machining center, as briefly described above, the machining job is normally carried out with use of an inserted chaser tap comprising a tool base 30 insertedly fixed with a plurality of tap segments 28 by screw fixing means, as shown in FIG. 2, in place of the (foregoing) illustrated shell tap.

Figure 3:
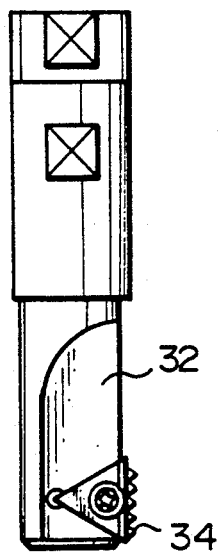
FIG. 3 is an illustrative elevational view of a conventional screw cutter comprising a shank fixed with a tap cutter adapted for use in machining a large size diameter screw.
Figure 4:
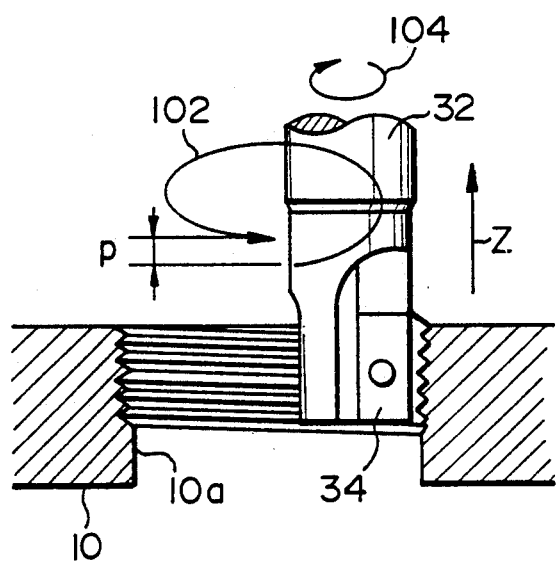
FIG. 4 is a schematic sectional view of a conventional technique for machining a large size diameter thread in accordance with the conventional helical feed principle with use of a screw threading cutter.

It has been observed, however, that with use of the foregoingly illustrated shell tap or inserted chaser tap, a screw cutting of a considerably larger diameter and a screw-cutting of nominal diameter M-100 class or so was carried out only defectly. In consideration of this kind of difficulty, use was made of such a screw cutter comprising a shank 32 fixed with a tap cutter 34, as shown in FIG. 3. In use of this improved kind of screw cutter, the latter is so arranged and driven relative to the prefabricated guide opening 10a for the work 10 that the cutter takes a planetary motion as at 102 and simultaneously in synchronism therewith a rotational movement about its own axis as at 104, and indeed, for the execution of a considerably larger diameter screw cutting job. This kind of screw-cutting operation is known among those skilled in the art as "helical feed", wherein the shank 32 is axialy fed by a pitch "p" in the direction "z" for every planetary revolution thereof.

As may be well understood from the foregoing description, it is possible by utilization of such helical feed technique as mentioned above to execute a considerably larger diameter screw cutting job as desired.

According to our practical experience, however, it has been found that with use of the foregoing conventional screw cutting device, the degree of fabrication error depends on the precision degree of precision of the cutting edges on the screw cutting tool, as a remarkable defect of the cutting device. In addition, errors in fabricational precision, especially in the screw pitch as well as effective screw diameter are frequently encountered, and indeed on account of such fact that during the screw cutting job, the rotary cutting tool spindle must execute the planetary rotational movement in synchronism with its own rotational movement about its own longitudinal axis. These defects are highly defective and disturb the realization of an ideal high precision screw cutting job.

Further still, in addition, even with utilization of the helical feed, desirous variable pitch screw-cutting and/or taper screw-cutting at any desired taper angle setting were practically impossible to realize.

It is, therefore, an object of the invention to provide a highly improved screw cutting device, capable of executing a hitherto before impossible larger diameter screw cutting job and/or special screw cutting job, nevertheless assuring a high precision accuracy and a high operational efficiency.

For the fulfillment of the foregoing main object as well as related subsidiary objects becoming clearer as the description proceeds, it is proposed according to this invention.

PREFERRED EMBODIMENT OF THE INVENTION

Further referring to FIGS. 5-10, a preferred embodiment of the invention will be illustrated in detail.

Figure 5:
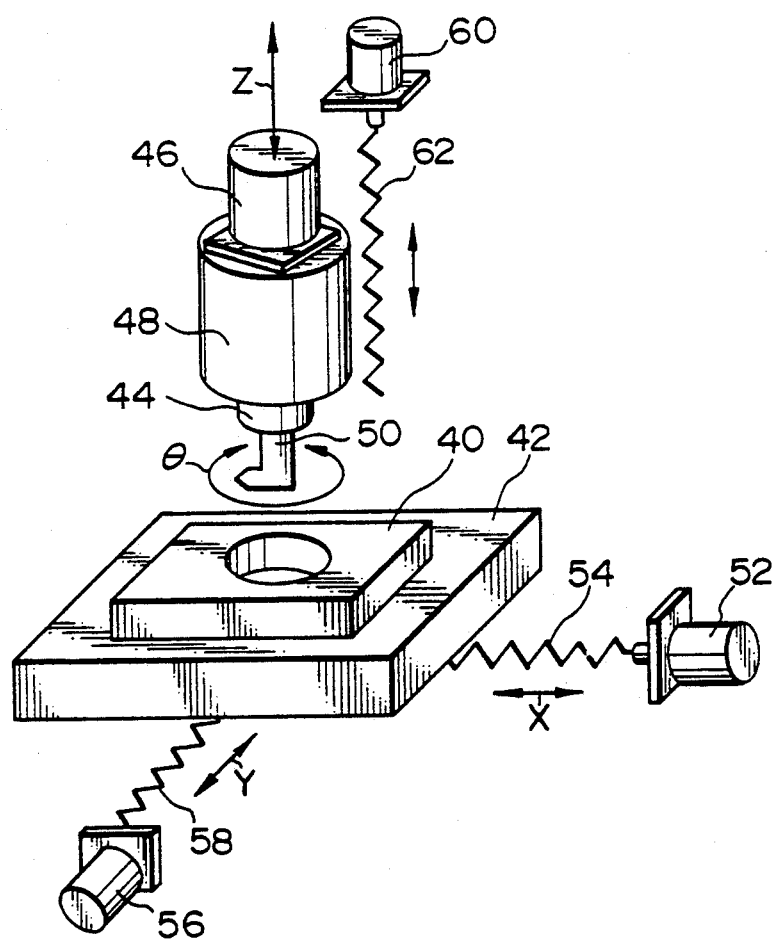
FIG. 5 is a similar view to FIG. 1, showing however an arrangement of an inventive screw threading setup.

In FIG. 5, the inventive embodiment is shown only schematically and substantially in the similar manner with the foregoing FIG. 1.

In this inventive screw-cutting device, numeral 40 represents a work which is fixedly mounted on a work table 42.

A rotatable spindle 44 is arranged in opposition to the work 40 or work table 44 and fitted with a spindle head 48, thus being capable of rotating by energization of a spindle drive motor 46, substantially in the similar manner with those which were shown and described in FIG. 1.

It will, therefore, be well understood that the spindle 44 may be fitted with an end mill, a drill or the like cutting tool which is frequently utilized in the machining center arrangement, and driven under desired rotational speed control for the execution of normal milling or drilling job.

A characterizing feature of the inventive machine is such a possibility that the main spindle 44 is capable of operating at a relatively low rotational speed under rotational phase control, as hinted by a symbol $\theta$, during the screw-cutting operation when this kind of machining is selected. In this case, screw cutting tool 50 is so positioned on the spindle 44 that its cutting portion is perpendicular to the axis Z of the latter.

On the other hand, the work table 42 is arranged to be fed in the X-direction under the joint operation of an X-feed motor 52 and an X-feed screw 54. In the similar way, the table 42 may be subjected to Y-direction feed under the joint operation of a Y-feed motor 56 and a Y-feed screw 58. Thus, it may be well understood that the table 42 is subjected to two mutually perpendicular X- and Y-directional position controls during operation of the inventive machine.

On the other hand, the spindle 44 is driven under positional control in the Z-direction to any desired degree by the joint action of axial feed motor 60 and an axial feed screw 62. Thus, during the operation of the machine for screw-cutting, the desired screw pitch is determined by the Z-directional position or feed control.

Figure 6:
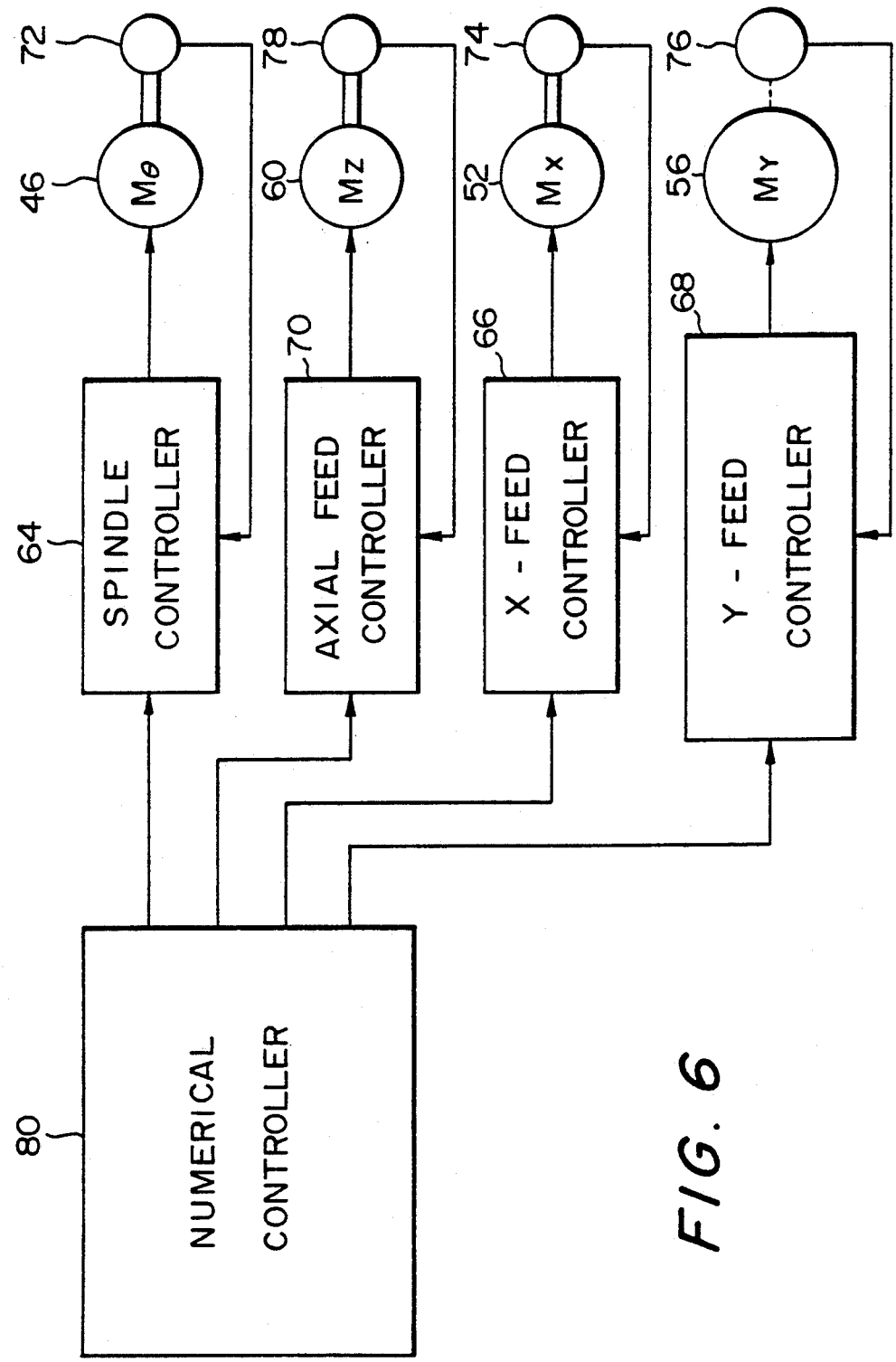
FIG. 6 is a schematic block diagram showing the inventive setup.

In the block diagram shown in FIG. 6, an overall composition of the inventive machine by way of screw cutting operation is schematically shown. As seen, feed motors 46, 52, 56, and 60 are provided with respective controllers 64, 66, 68 and 70. In addition, there are provided respective phase sensors 72, 74, 76, and 78 for sensing rotational phase angles of said motors, respectively, for feeding them to said respective controllers.

It should be understood that said phase sensors 72, 74, 76, and 78 may take the form of rotary encoders or the like means which are arranged in proximity of the motor shafts, although not specially shown.

Thus, with use of these controllers 64; 66; 68 and 70, respective rotational phase of respective motors 46; 52; 56 and 60 are constantly supervised for the purpose of feed control of said respective motors, so as to optimally control the rotational phase as well as axial feed of the main spindle 44, for desired X- and Y- directional control of the work table 42.

The controllers 64; 66; 68 and 70 are subjected to synchronous control by a numerical controller 80, and, during a complete revolution of the tool spindle 44 under rotational phase control, the work table 42 is driven by a complete revolution about the axis Z of tool spindle in synchronism of the spindle rotation. In this case, it will be understood that the thus resulting screw threading is carried out at such a cutting speed corresponding to the speed difference between the screw cutting tool 50 and the work 40. In this case, the tip of the tool 50 can be directed tangentially to generate the circle of the screw to be machined, as in the case of the conventional turncutting system.

Thanks to the inventive adoption of combined drive of spindle 44 and work table 42, the threading tool 50 will be kept in pressure contact with the outer or inner surface of the work 40 so as to perform a large diameter, variable pitch or taper screw cutting into the outer or inner surface of the work 40 and with a predetermined cut-in depth.

The screw pitch under fabrication is determined, as is clear from the foregoing description, by a Z-direction positional control degree preset for the machining spindle 44 at the numerical controller 80. The latter controls in synchronism and in accordance with a previously memorized machining instruction, both rotational phase angle and axial feed of the spindle 44 as well as X- and Y-direction coordinates for the work table 42.

It is also possible to control the machining center for occasional operation of conventional manner via the numerical controller 80. As an example, a revolution control instruction may be given from the controller 80 to the spindle 44. It is also possible, to merely give a work shifting instruction from the controller 80 to the table 42.

Figure 7:
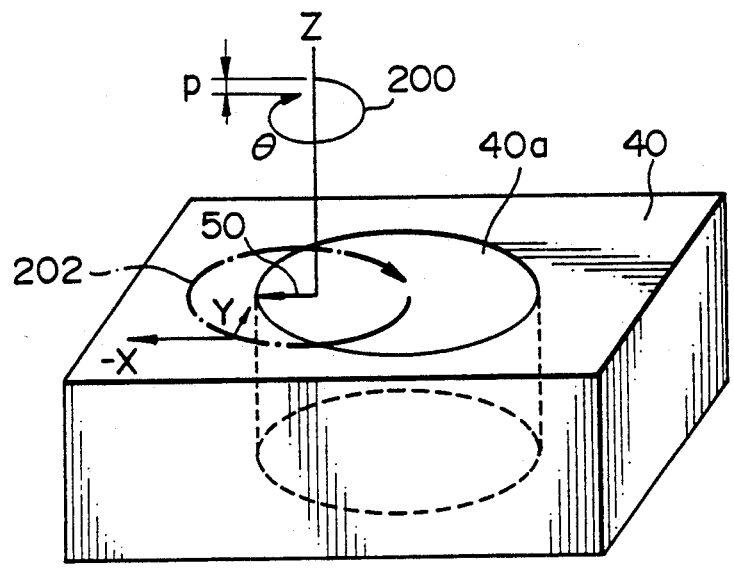
FIG. 7 is a schematic perspective view illustrating the mutual relationship between the cutter and the work, representing the inventive working principle.
Figure 8:
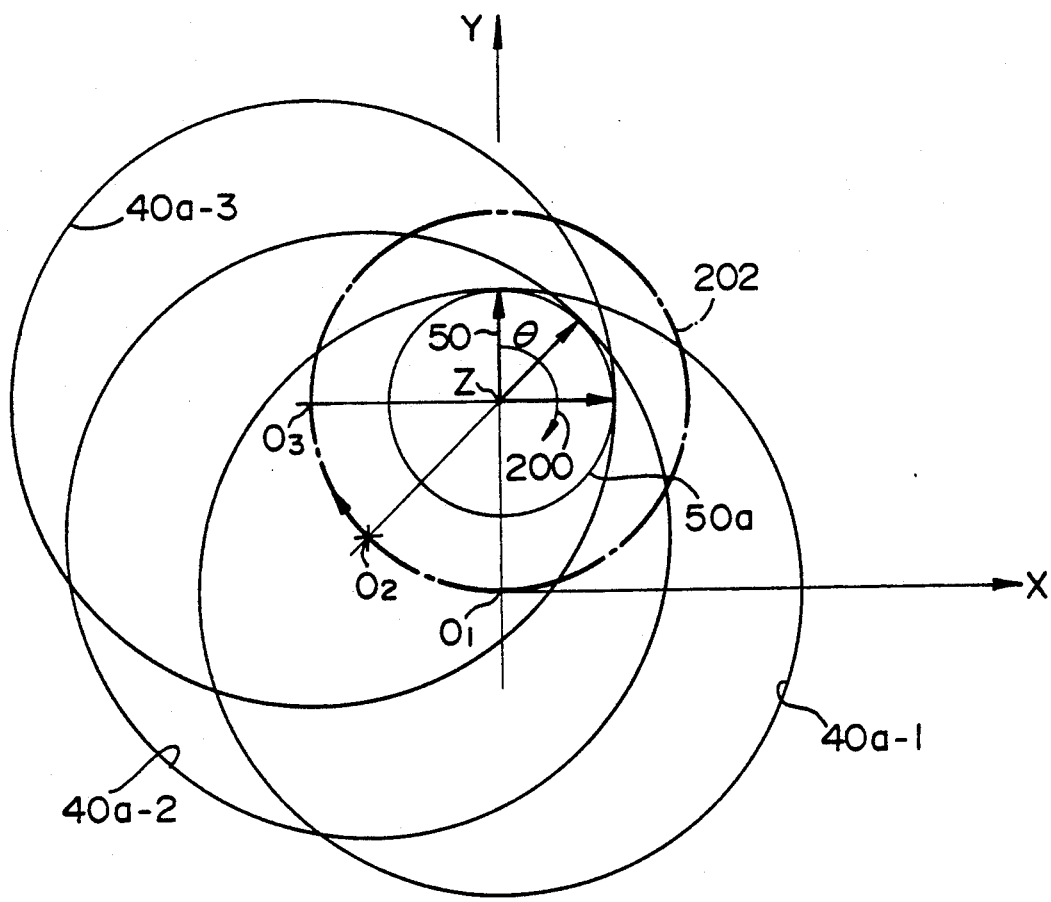
FIG. 8 is a schematic plan view showing the mutual relationship between the cutter and the work corresponding to FIG. 7.

FIG. 7 represents a schematic display of a working mode for threading a female screw on the work 40. FIG. 8 shows several relative moving locuses and centrodes of and among spindle 44 and the work, projected successively on the plane of the work or work table, specifically showing the relative relationship between the said spindle and work.

It should be noted that a specific characteristic feature of the invention resides in that the central axis Z of main spindle 44 can be deemed as fixed to the X-Y plane, and that the said spindle may be deemed as being controlled only in the rotational direction $\theta$.

In these drawings, FIGS. 7 and 8, a short straight arrow 50 representing the screw cutting tool is shown as being driven rotationally, symbolized by a curved arrow at 200, around the central axis Z.

The rotational phase angle $\theta$ is always supervised at the phase sensor 72.

In this invention, it will be easily understood that for each complete revolution of screw cutting tool 50, the axial feed motor 60 provides a predetermined axial feed corresponding to the screw pitch "p" in Z-direction. Naturally, this screw pitch "p" may be desireously modified, as the numerical controller 80 is present for this purpose, or more specifically to determine the feeding quantity.

On the other hand, the work 40 (or work table 42) is subjected to X- and Y-directional feed control. In FIG. 8, the prefabricated guide opening 40a is representatively displayed at specifically selected three positions at 40a-1, 40a-2 and 40a-3, corresponding respectively to 0 deg., 45 deg. and 90 deg. of the angle $\theta$ formed by the cutting tool 50. In order to rotationally drive the work table 42 by a complete revolution while the tool 50 is being kept in pressure contact with the inside peripheral surface of the prefabricated guide opening 40a with a predetermined cut-in depth for one complete revolution of the tool-bearing spindle 44, the center O of guide opening 40a must shift through points $O_1$; $O_2$ and $O_3$ in FIG. 8, which positions are in opposition through spindle axis Z to respective working points of the screw cutting tool 50, and indeed, always with a constant distance. Therefore, it will be seen that the centrode of the center point O of the said guide opening 40a represents a circular arc 202 with its center coincident with the spindle axis Z.

It will be further clear in this case that the radius of the said circular arc centrode corresponds to the differential between the radius of the prefabricated guide opening 40a through the work 40 and that of the tool 50 reaching from the axis of the spindle 44 to the working point of the tool 50.

The locus of the working point of the tool 50 is shown as 50a in FIG. 8.

Thus, with one complete revolution of spindle 44 and that of work table 42, a complete turn of screw thread can be machined by the threading tool 50 on and in the inside wall surface of the circular guide opening 40a, the machining velocity corresponding to the difference of the revolutional speed of the cutting tool 50 and that of the prefabricated circular opening 40a of the work.

It will be well understood that according to the inventive principle such that machining spindle 44 and work table 42 are synchronously position-controlled while the feeding pitch in Z-direction is subjected to control; a desired, larger diameter screws; variable pitch screws or tapered screws which are called special screws can be machined in an easy, precise and efficient manner.

Figure 9:
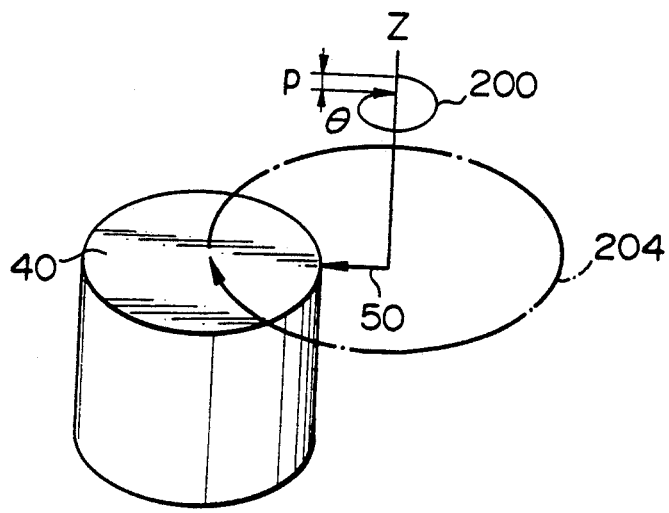
FIG. 9 is a schematic explanatory diagram showing the mutual relationship between the cutter and the work in the case of an inventive embodiment.
Figure 10:
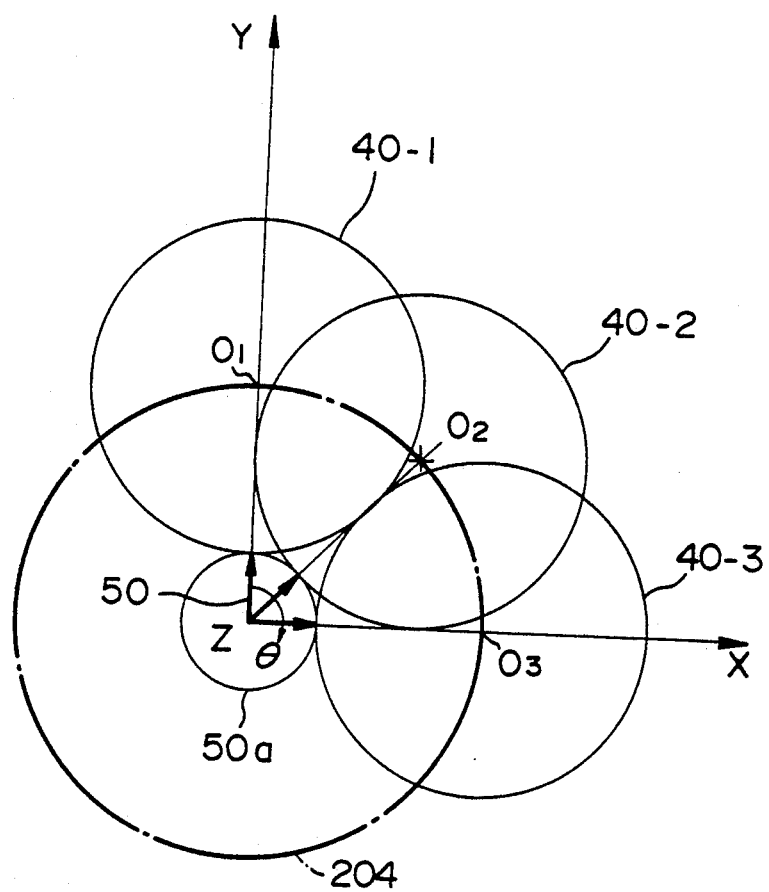
FIG. 10 is a schematic explanatory plan view, illustrating the relationship between the cutter and the work and is based on the setup shown in FIG. 9.

The display shown in FIG. 9 represents schematically a male screw machining mode where the work 40 is being threaded on its outer peripheral surface. FIG. 10 is a schematic plan view specifically illustrating relative shift movements of machining spindle 44 and work 40 in this case.

In the similar way with the foregoing female screw machining mode, in the present male screw machining mode, the axis Z of machining spindle 44 is also fixed, around which, the work 40 (or work table 42) is caused to rotate and the locus shown at 204 describes a circle around the said axis Z.

In this case, the radius of the locus corresponds to a sum of the radii of cutting tool 50 and work 40.

Screw diameter, screw pitch, screw taper, if any, and the like dimensional data, can also be preset as desired at the initial setting stage of numerical controller 80.

Thus, according to the present invention, larger diameter screws, variable pitch and taper screws which may be called "special screws threads", and are generally impossible to fabricate with the use of conventional screw cutting taps or dies, can be machined with high precision and at a high speed.

It is also possible to fabricate male or female threads with a single cutting tool, even if they may be right- or left handed threads, by modifying the initial setting at the numerical controller. Generally speaking, it may be defined that the inventive screw cutting technology resides in a combination of the broad availability of the machining center with the high precision machining of conventional screw turning technology, thus providing an amazingly high efficient and precise thread-cutting technology.

Further, the shortest possible tool setting period for thread-cutting under utilization of the machining center and a considerable economy in tool usage cost can be advantageously realized.

While specific embodiments of the invention have been shown and described in detail to illustrate the application of the inventive principles, it will be understood that the invention may be embodied otherwise without departing from such principles.

What we claim is:

1. A screw cutting machine comprising:
   a table mounting a work thereon;
   a rotary cutter spindle exchangeably carrying any selected one of screw cutting tools extending in a perpendicular direction relative to a longitudinal axis of said spindle;
   a table feed drive apparatus for feeding said work table with positional control thereof in two mutually perpendicular directions (X, Y);
   a spindle drive apparatus capable of rotary driving said spindle at a relatively slow speed and with control of a rotational phase ($\theta$) thereof;
   an axial feed drive apparatus for feeding said spindle in an axial direction (Z) with positional control thereof toward said work; and
   a numerical control apparatus for driving said work table in a complete circle about the axis of said spindle while keeping said screw cutting tool in contact with an internal or external surface of the work and while keeping a preselected limit of cutting depth for a complete revolution of said spindle, and for allowing said rotary spindle at the same time to move axially thereof in a length corresponding to a predetermined screw pitch to be machined and in synchronism with said full circle ratational movement of said spindle.

2. The screw cutting machine of claim 1, wherein each of said table feed drive apparatus, said spindle drive apparatus and said axial feed drive apparatus comprises:
   a drive motor;
   a phase sensor for sensing rotational phase of said drive motor; and
   a controller for receiving phase display signal from said phase sensor and for motion control of said drive motor, said numerical controller performing synchronous control of all the said three drive apparatuses.

3. The screw cutting machine of claim 1, wherein said axis of said rotary cutting spindle is held fixedly on a X-Y plane preset in said machine.

4. The screw cutting machine of claim 2, wherein each of said respective phase sensors consists substantially of a rotary encoder.

5. A process for female screw threading a work on a table with use of a rotary spindle carrying a screw cutting tool thereon directed perpendicular thereto, said process comprising the steps of:
   rotating said spindle;
   rotating said table at a rate that said table performs a complete revolution around a central axis of said spindle for each complete revolution of said spindle while keeping said tool in pressure contact with an inside surface of said work and at a predetermined maximum cutting depth; and
   axially feeding said spindle by a predetermined length equal to a certain pitch of the screw to be machined and in synchronism with the steps of rotating said spindle and said table.

6. A process for male screw threading a work on a table with use of a rotary spindle carrying a screw cutting tool thereon directed perpendicular thereto, said process comprising the steps of:
   rotating said spindle;
   rotating said table at a rate that said table performs a complete revolution around a central axis of said spindle for each complete revolution of said spindle while keeping said tool in pressure contact with an external surface of said work at a predetermined maximum cutting depth; and
   axially feeding said spindle by a predetermined length equal to a certain pitch of the screw to be machined and in synchronism with the steps of rotating said spindle and said table.

* * * * *